United States Patent
Hutchins, IV

[11] 3,857,161
[45] Dec. 31, 1974

[54] METHOD OF MAKING A DUCTILE HERMETIC INDIUM SEAL

[76] Inventor: Thomas B. Hutchins, IV, 310 N.W. Brynwood Ln., Portland, Oreg. 97229

[22] Filed: Feb. 9, 1973

[21] Appl. No.: 331,038

[52] U.S. Cl............ 29/472.7, 29/473.1, 29/DIG. 22
[51] Int. Cl............................................ B23k 31/02
[58] Field of Search ....... 29/472.7, 473.1, 492, 494, 29/DIG. 22; 317/234 M

[56] References Cited
UNITED STATES PATENTS

| | | | |
|---|---|---|---|
| 2,053,765 | 9/1936 | Dana............................... | 29/473.1 X |
| 2,098,411 | 11/1937 | Wrighton........................... | 29/492 |
| 3,042,550 | 7/1962 | Allen et al........................ | 29/473.1 X |
| 3,107,756 | 10/1963 | Gallet............................. | 29/473.1 X |
| 3,287,612 | 11/1966 | Lepselter......................... | 317/234 |
| 3,393,446 | 7/1963 | Hughes et al...................... | 29/492 |
| 3,413,711 | 12/1968 | Brewer et al...................... | 29/473.1 |
| 3,460,241 | 8/1969 | Ehrenberg......................... | 29/473.1 X |
| 3,523,222 | 8/1970 | Jaeger............................. | 317/234 |
| 3,590,467 | 7/1971 | Chase et al....................... | 29/473.1 X |
| 3,609,472 | 9/1971 | Bailey............................. | 317/234 |
| 3,686,080 | 8/1972 | Banfield et al.................... | 317/234 |
| 3,747,173 | 7/1973 | Lind............................... | 29/DIG. 22 |
| 3,798,746 | 3/1974 | Alphonse et al.................... | 29/472.7 X |

FOREIGN PATENTS OR APPLICATIONS 1,564,901    2/1970    Germany............................. 29/492

OTHER PUBLICATIONS

Belser, Richard B., "A Technique of Soldering to Thin Metal Films," The Review of Scientific Instruments, Vol. 25, No. 2, 2/54, pp. 180–184.

Primary Examiner—Francis S. Husar
Assistant Examiner—Ronald J. Shore
Attorney, Agent, or Firm—Kolisch, Hartwell, Dickinson & Stuart

[57] ABSTRACT

A ductile hermetic seal between closely adjoining surfaces is provided by first adhering to at least one of the surfaces a coating of a platinum group metal, e.g., platinum. Next, to each such coating is adhered a coating of gold. Finally, the surfaces are joined with indium. Seals thus produced are useful in vacuum or gas-filled systems, such as laser structures.

12 Claims, 3 Drawing Figures

METHOD OF MAKING A DUCTILE HERMETIC INDIUM SEAL

BACKGROUND OF THE INVENTION

1. Field of the Invention

The present invention relates to seals between closely adjoining surfaces, and to methods for providing such seals. More particularly, the invention relates to ductile hermetic seals of indium, and methods for producing such seals.

2. Description of the Prior Art

In assembling components of evacuated or gas-filled systems, it is often necessary to provide hermetic seals between the surfaces of closely adjoining members of a system. Many methods of producing such seals have been disclosed in the past. More recently, however, the need to join materials having very low thermal expansion coefficients, and to join such materials with others having higher coefficents as in, for example, laser structures, has produced sealing requirements which cannot be met by prior art processes.

One method involving the use of indium as a sealant has recently been described by U. Hochuli and P. Haldemann in *The Review of Scientific Instruments*, Volume 43, No. 8 (August 1972), pages 1,088–89. The authors provide indium metal seals between adjoining surfaces of system components comprising vitreous materials, metals, and semiconductors. Molten indium "wets" and bonds directly to some materials, such as gold and clean, unoxidized copper. Other materials, including, for example, vitreous materials commonly used in laser systems, are not wettable directly in indium. Therefore, the authors first apply a thin layer of gold to each of the non-wettable surfaces to be joined. Next, the surfaces are positioned in contact with each other and a length of indium wire is placed along an edge of the interface between them. Following this, the assembled components are heated in a vacuum of $10^{-5}$ Torr, or better, to melt the indium, which then flows along the interface between the pieces to be joined. Upon cooling, a ductile hermetic seal is formed.

Because of indium's ductility and low melting point, materials having different thermal expansion coefficients may readily be joined. For example, parts made of borosilicate glass (Pyrex) may be sealed directly to those of quartz glass, eliminating the need for conventional graded seals. In addition, components may be disassembled easily by heating a seal to melt the indium, and then separating the parts.

Despite its several advantages, however, the method just described has a number of drawbacks. For example, gold, applied to the non-wettable surfaces to serve as a wetting agent for the indium, is highly soluble in indium. Thus, unless a sufficiently thick film of gold is applied to the surfaces, it may completely dissolve in the molten indium, resulting in "dewetting" of the surfaces and failure of the seal. In addition, the strength of bonds produced by the above-described sealing technique is lower than desired for some applications. Therefore, a need exists for an improved ductile hermetic seal having increased strength and greater reliability compared with prior art seals.

SUMMARY OF THE INVENTION

According to the present invention, an improved ductile hermetic seal is provided between closely adjoining surfaces, at least one of which is not wettable by molten indium, by first adhering to each such non-wettable surface a coating of a platinum group metal. Then, to each platinum group metal coating a coating of gold is adhered. Finally, the surfaces are joined with indium. According to one embodiment of this invention, platinum group metal coatings are adhered by coating each non-wettable surface with a platinum group metal-containing composition capable of decomposing upon exposure to a high temperature to produce a platinum group metal coating on the surface. The coated surface is then exposed at a temperature and for a time sufficient to decompose the composition and yield a platinum group metal coated surface.

Seals produced between surfaces of vitreous bodies by this method show improved strength compared to similar seals made without a platinum group metal undercoating. This improvement is thought to result from the greater strength with which such metals bond to glass and other vitreous materials. In addition, because the platinum group metals have a lower solubility in indium than does gold, dewetting of joint surfaces is avoided and a higher strength, more reliable seal is produced.

Seals produced by the method of the present invention have particular utility in joining materials having significantly different thermal expansion coefficients. Such joints are frequently required, for example, in the assembly of laser structures, wherein generally disk-shaped window bodies of various materials are joined to borosilicate glass tubes. Accordingly, the invention will be described hereinafter with particular reference to the assembly of a laser structure comprising an elongate tube having disk-shaped windows or end caps sealed to either end of the tube.

DESCRIPTION OF PREFERRED EMBODIMENTS

In laser structures with internal mirrors, constant mirror positioning is required for frequency stability and maximum optical efficiency. Since the end cap seals are part of the mirror separation distance in lasers of this type, they should be extremely thin to prevent changes in separation distance through, for example, thermal expansion of the indium. Minimum seal thickness is obtained by providing a close mechanical fit between the joint surfaces of the components. This may be done by lapping the parts together with an abrasive compound. A lap joint produced using No. 400 grit has proved satisfactory in this application.

After the surfaces to be joined have been prepared, a coating of a platinum group metal is applied or adhered to each surface. As will readily be appreciated, if one of the materials to be joined has a surface which is readily wettable by molten indium, or already has an indium-wettable coating other than gold, it need not be provided with a platinum group metal coating.

The term "platinum group metal" is used herein to designate the group consisting of platinum, palladium, irridium and rhodium. Although such coatings may be applied, for example, by vacuum deposition, a preferred method is to coat the surfaces with a platinum group metal-containing composition which will decompose upon exposure to a high temperature and leave a metal coating on the surface. Such compositions include, for example, platinum group metal resinates dissolved or dispersed in suitable carriers. Suitable compositions are commercially available in the form of "paints" which include, in addition to a metal resinate and a carrier, other ingredients such as a flux. For proprietary reasons, the exact formulas of these paints are not available. Commercial formulations usable in practice of the invention are obtainable, for example, from the Engelhard Company, and include their No. 05-X Brushing Brite Platinum. Other suitable compositions include their No. 9450 (26 percent platinum), No. 7611 (20 percent palladium), No. 8057 (24 percent iridium), and No. 8826 (10 percent rhodium). In general, compositions containing about 10 percent to about 30 percent of a platinum group metal are suitable.

After a coating of a metal-containing paint has been applied, as by brushing, to a surface of a part, the part is heated or fired in air at a high temperature to decompose the paint and produce a metal coating adhered to the surface. The firing temperature is dependent upon the material forming the part. For example, soda-lime glass may be fired at about 450° C., borosilicate glass at about 550° C., quartz glass and vitrified ceramics at about 800° C. In general, the lower melting point glasses should be fired near their annealing points. When using paints having low percentages of platinum group metals, it may be necessary to fire a second layer over the first. The need for a multilayer coating may be readily determined by routine experimentation.

After a coating of a platinum group metal has been adhered to a surface, a coating of gold is adhered thereover. A preferred method of applying the gold coating is to use the same general procedure outlined above, substituting a gold-containing paint for that previously used. Suitable commercially available gold paints include the Engelhard Company's Liquid Bright Gold No. 4813 (12 percent gold), and No. A118 (24 percent gold).

Following the application of a gold coating over a platinum group metal coating on each of the non-wettable surfaces to be joined, the coated surfaces are brought into contact and held together in a suitable manner. A length of indium wire of 99.9+% purity is then placed around the outer perimeter of the joint and the parts are heated in a vacuum of $10^{-5}$ Torr, or better, to a temperature of about 250° to 300° C. If desired or convenient, an inert atmosphere may be used instead. However, it has been surprisingly found that superior seals result from heating the parts in a reducing atmosphere, such as an atmosphere of forming gas, a mixture of about 10 percent by vol. of hydrogen and about 90 percent by vol. of nitrogen. The heating is continued until the indium wire melts and spreads along the interface between the parts. As will be appreciated, the time required depends upon the size of the parts, the temperature of the furnace, etc. However, because of the color or contrast between the indium and the gold coating, the degree of spreading may be readily determined by simple observation.

The method outlined above may be used to join many materials, including, as previously mentioned, vitreous materials such as soda-lime glass, borosilicate glass, quartz glass, vitrified ceramics, etc. In addition to joining one vitreous material to another, the method is useful for joining metal components of, e.g., copper or aluminum to vitreous materials, or for joining a semiconductor part of, e.g., germanium or gallium arsenide to a part made of vitreous material. As previously mentioned, if one of the joint materials has a surface readily wettable by molten indium, such as clean, unoxidized copper, or if one of the materials already has an indium-wettable coating, such as copper-plated Invar, it need not be provided with a platinum group metal/gold coating. Thus, for example, a copper end cap may be sealed to a borosilicate glass tube after adhering platinum group metal and gold coatings to the seal areas of the tube alone. It should be pointed out that the term "wettable" is used herein to indicate wettability by the molten indium under the conditions and with the procedures of seal formation disclosed herein.

Because of indium's high ductility, seals produced by the method of the invention are able to withstand severe thermal stress. Thus, seals may be made between the materials having substantially different thermal expansion coefficients. The example of sealing a copper part directly to one of borosilicate glass has already been mentioned. In addition, borosilicate glass may be sealed directly to quartz glass, thus eliminating the need for conventional graded seals between these materials.

A further advantage of the indium seals of the invention results from indium's electrical conductivity. If desired, an indium seal may be used as an electrical current feed through.

DESCRIPTION OF THE DRAWINGS

A better understanding of this invention will be had by reference to the accompanying drawings, and the following specific examples, given by way of illustration. In the accompanying drawings:

In FIG. 1, a portion of a structure 10, such as a laser structure, includes an elongate tubular member or tube 20 of, for example, borosilicate glass. A window or end cap 30 is joined to tube 20 by the method just described above. Thus, end cap 30 is sealed to tube 20 by ductile hermetic seal 40. Referring to FIG. 2 which illustrates an embodiment of the invention wherein end cap 30 is of an indium-wettable material, seal 40 includes a coating 42 of a platinum group metal, here platinum, adhered to joint surface 22 of tube 20. Adhered to coating 42 is a second coating 44 of gold, with a layer 46 of indium joining coating 44 and surface 32 of end cap 30.

FIG. 3 illustrates an alternative embodiment wherein a window or end cap 30 of a non-indium wettable material such as quartz glass is joined to tube 20. Thus, seal 40 includes a first coating 42a of a platinum group metal, here platinum, adhered to joint surface 22 of tube 20, and a similar coating 42b adherhed to joint surface 32 of end cap 30. Adhered to each of coatings 42a, 42b are second coatings 44a, 44b of gold, with a layer 46 of indium joining the gold coatings.

Figure 1:
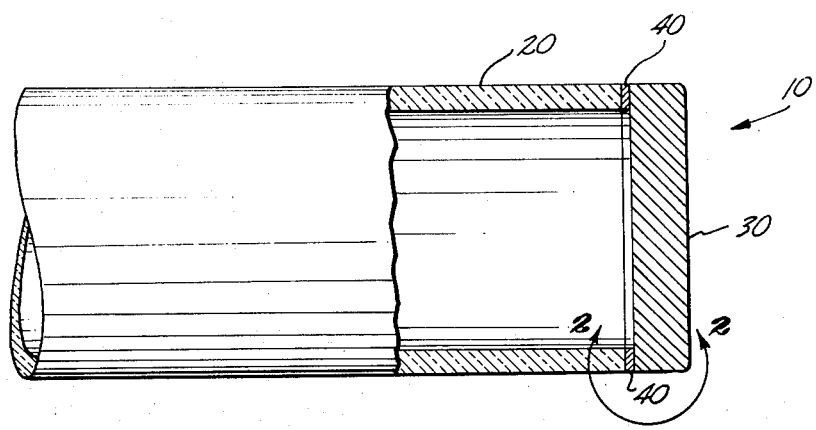
FIG. 1 is a side elevation, partially in section, of a portion of a laser tube.
Figure 2:
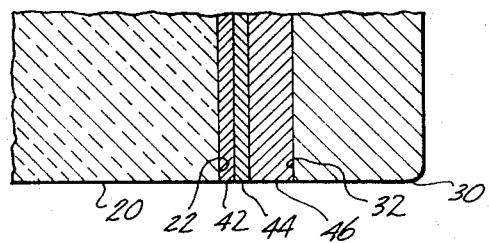
FIG. 2 schematically depicts in greatly exaggerated scale a portion of the seal area of FIG. 1.
Figure 3:
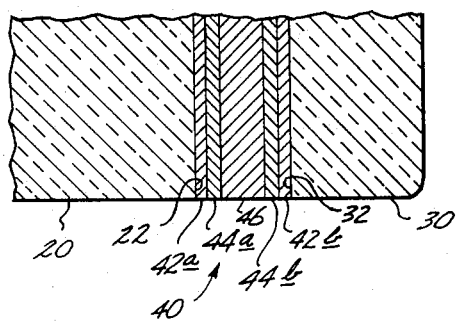
FIG. 3 illustrates an alternative embodiment of the seal area of FIG. 1.

It will be noted that FIGS. 2 and 3 are merely schematic representations of actual seals. Because of gold's solubility in indium, the interfaces between the indium and gold layers in the seal would not ordinarily be detectable in a photomicrographic cross section of an actual seal.

Example

A borosilicate glass (Pyrex) tube having a diameter of about one-half inch and a wall thickness of about one-eighth inch, and an end cap of quartz glass having a diameter of about one-half inch and a thickness of about one-eighth inch are prepared for joining by lapping the end cap to the end of the tube using a No. 400 grit. After the lapped surfaces are suitably cleaned, they are individually platinum coated. The platinum is applied by first coating the seal areas of each part with Engelhard No. 05-X Brushing Bright Platinum paint. The parts are then fired in air to a temperature of about 550° C. until the paint has completely decomposed. A firmly adhered platinum layer having a thickness of between about 5 and 10 microinches results. Next, a coating of Engelhard No. 4813 Liquid Bright Gold paint is applied over the platinum coating, and the parts are again fired in air to 550° C. A coating of gold, firmly adhered to the previously applied platinum coating and also having a thickness of between about 5 and 10 microinches, is produced.

Next, with the Pyrex tube supported in a vertical position, coated end up, the quartz glass end plate is set in place on the end of the tube. A weight, placed on the top surface of the end plate, serves to keep the parts in close contact. A ring of indium wire (99.9+% pure) is then placed around the outer periphery of the interface between the two parts, and the assembly is heated in an atomsphere of forming gas to a temperature of about 300° C. for about one-half hour. The indium melts and spreads in along the interface through alloying and capillary action. Upon cooling the indium solidifies, producing a ductile hermetic seal between the tube and end cap.

The procedure just described is repeated, with similar results, using Engelhard No. 7611 palladium paint in place of the platinum paint previously used.

Although several preferred embodiments of the invention have been described herein, it is understood that further variations and modifications are possible without departing from the spirit of the invention. Thus, although the invention has been described with relation to a method wherein metal coatings are applied through the thermal decomposition of metal-containing compositions, other application methods may be used. For example, metal coatings of the type contemplated may be applied by vacuum deposition, sputtering, electroplating, or electroless deposition.

It is claimed and desired to secure by Letters Patent:

1. A method of producing a ductile hermetic seal between a pair of vitreous surfaces, comprising
adhering to each surface a coating of a platinum group metal,
adhering to each coating of said metal a coating of gold, and
joining the thus-coated surfaces with indium in a reducing atmosphere by heating said surfaces to a temperature at least equal to the melting point of indium, spreading molten indium along an interface between the heated surfaces to provide a layer of indium contacting both surfaces, and reducing said temperature below said melting point, whereby said indium solidifies, bonding the surfaces together.

2. The method of claim 1, wherein said platinum group metal is platinum.

3. The method of claim 1, wherein said platinum group metal is palladium.

4. The method of claim 1, wherein said platinum group metal coating is adhered by
coating said one surface with a platinum group metal-containing composition capable of decomposing upon exposure to a high temperature to produce a platinum group metal coating on the surface, and heating the coated surface at a temperature and for a time sufficient to produce said metal coating.

5. The method of claim 1, wherein said atmosphere is a mixture of about 10 percent by volume of hydrogen and about 90 percent by volume of nitrogen.

6. The method of claim 1, wherein said surfaces are of vitreous materials selected from the group consisting of quartz glass and borosilicate glass.

7. A method for forming a ductile hermetic seal between a pair of surfaces, one comprising a vitreous material, and the other a surface wettable by molten indium, said method comprising the subsequential steps of
adhering to said one surface a coating of a platinum group metal,
adhering to said coating of said metal a coating of gold,
placing the thus-coated surface and said other surface together, and heating them in a reducing atmosphere to a temperature at least equal to the melting point of indium,
spreading molten indium along an interface between the heated surfaces, and
reducing said temperature below said melting point whereby said indium solidifies, bonding the surfaces together and forming a ductile hermetic seal between them.

8. The method of claim 7, wherein said atmosphere is a mixture of about 10 percent by volume of hydrogen and about 90 percent by volume of nitrogen.

9. The method of claim 7, wherein said platinum group metal coating is adhered by
coating said one surface with a platinum group metal-containing composition capable of decomposing upon exposure to a high temperature to produce a platinum group metal coating on the surface, and heating the composition-coated surface at a temperature and for a time sufficient to produce said metal coating.

10. The method of claim 9, wherein said composition comprises a platinum group metal resinate, and said surface is heated at a temperature of about 450°C. to about 800°C.

11. The method of claim 7, wherein said gold coating is adhered by
coating the platinum group metal coated surface with a gold-containing composition capable of decomposing upon exposure to a high temperature to produce a coating of gold on said surface, and,
heating the composition-coated surface at a temperature and for a time sufficient to produce said gold coating.

12. The method of claim 11, wherein said composition comprises a gold resinate, and said surface is heated at a temperature of about 450°C. to about 800°C.

* * * * *